Oct. 2, 1962    G. I. H. WINANTS ETAL    3,056,671
GRANULATING AMMONIUM NITRATE-CONTAINING CALCIUM NITRATE MELTS
Filed Sept. 14, 1960
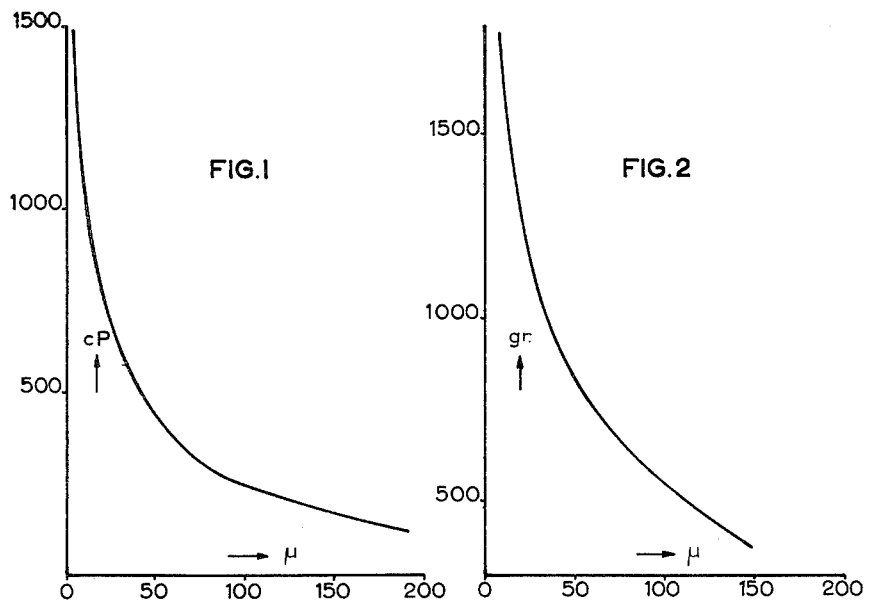
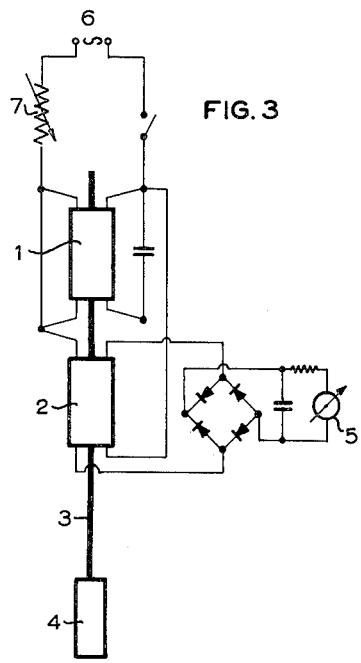
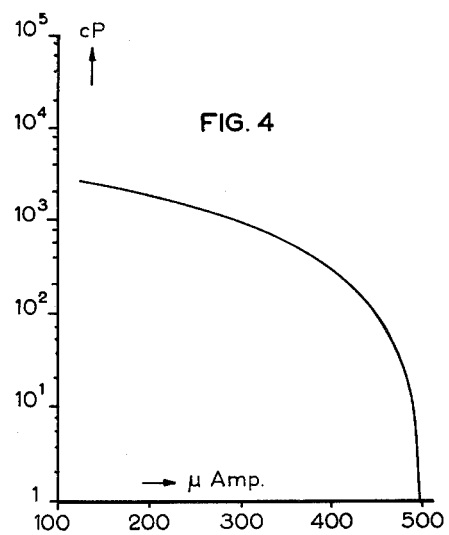
Inventors
Gerard J. H. Winants
Johan W. Hoogendonk
By Cushman, Darby & Cushman
Attorneys 3,056,671
GRANULATING AMMONIUM NITRATE-CONTAINING CALCIUM NITRATE MELTS
Gerard I. H. Winants and Johan W. Hoogendonk, Geleen, Netherlands, assignors to Stamicarbon N.V., Heerlen, Netherlands
Filed Sept. 14, 1960, Ser. No. 55,986
Claims priority, application Netherlands Sept. 17, 1959
5 Claims. (Cl. 71—64)

The present invention relates to the granulating of ammonium nitrate-containing calcium nitrate melts. More particularly, the invention is concerned with the preparation of calcium nitrate prills of improved characteristics by granulating ammonium nitrate-containing calcium nitrate melts in which the molar ratio of $Ca(NO_3)_2$ to $NH_4NO_3$ is between 4.5–9.

It is known that ammonim nitrate-containing calcium nitrate melts can be granulated by spraying the melt into drops which are allowed to fall into a liquid coolant in which the melt is not soluble, e.g. mineral oil. The drops solidify during their fall to form spherical granules which are called prills. These prills are recovered from the liquid coolant in any convenient fashion, for example, by centrifuging.

The strength of the prills obtained in the above manner is often inadequate. As a result, they are often subject to crushing in the centrifuging operation. This is particularly the case when use is made of continuously operating centrifuges.

Stronger prills may be obtained if the moisture content of the melt to be granulated is reduced to 10–14% by weight. However, an even greater crushing strength would be desirable and it is the principal object of the present invention to provide a novel process for obtaining prills of improved strength. Other objects will also be hereinafter apparent.

According to the present invention, it has been found that the crushing strength of prills, starting from an ammonium nitrate-containing calcium nitrate melt in which the molar ratio $Ca(NO_3)_2/NH_4NO_3$ is between 4.5–9 and the moisture content 10–14% by weight, may be even further improved if the average dimension of the $Ca(NO_3)_2.O$ aq. crystals in the melt evaporated to a moisture content of 10–14% by weight, is such that it does not exceed 110μ. It should be noted at this point that the term "melt" as used herein is intended to stand for an incompletely melted mass, i.e. a mass which comprises an amount of solid phase in addition to a large amount of liquid phase. Usually the solid phase will comprise from 30 to 40% of the melt. The term "$Ca(NO_3)_2.O$ aq. crystals" is intended to mean calcium nitrate crystals which contain no water of crystallization.

It has been found that the smaller the dimensions of the crystals, within the limits herein prescribed, the stronger the prill. This is demonstrated by the following: 28.7 g. $Ca(NO_3)_2.O$ aq. crystal and 3.5 g. of water-insoluble material in the form of talc are added to 67.8 g. of the liquid phase of the melt so that a melt with the usual moisture and nitrogen content is obtained. Prills are thereafter made from the resulting melt. As shown in the following table, the viscosity of the melt and the crushing strength of the resulting prills are dependent on the dimensions of the $Ca(NO_3)_2.O$ aq. crystals added.

| Average dimensions of the $Ca(NO_3)_2.O$ aq. crystals in the melt (28.7 g. to 67.8 g. of melt) | Composition of the melt to be granulated after adding $Ca(NO_3)_2.O$ aq. crystals | | | Apparent viscosity at 130° C. in cp | Crushing strength in grams |
|---|---|---|---|---|---|
| | Water-Insoluble, percent | Total N-content, percent | Moist. content, percent | | |
| 25μ | 3.5 | 15.65 | 11.8 | 750 | 1,200 |
| 80μ | 3.5 | 15.60 | 11.8 | 320 | 680 |

The foregoing shows a substantial increase in crushing strength by decreasing the size of the $Ca(NO_3)_2.O$ aq. crystals in the melt. However, in connection with the processability of the melt, it is also important that the crystals have a minimum size. Thus, in the case of very small crystal dimensions, i.e. below 10μ, the viscosity of the melt increases considerably with the result that it is difficult to spray into drops of the desired dimension (appr. 2 mm. in diameter). A highly viscous melt also gives rise to difficulties during and after the evaporation because of poor pumpability and poor heat transfer, which in turn decrease substantially the capacity of the evaporator.

It has been found that at 130° C., melts with an apparent density of more than 1,000 centipoises suffer from the abovementioned drawbacks. Such a viscosity is obtained if, in a melt of a moisture content of 10–14%, the average dimension of the $Ca(NO_3)_2.O$ aq. crystals is less than 10μ.

The invention is further illustrated in the accompanying FIGURES 1 and 2 wherein:

FIGURE 1 shows the relationship between the apparent viscosity in centipoises (cp.) of a melt with 15.65% N, obtained in practice at 130° C., and the average dimension in μ of $Ca(NO_3)_2.O$ aq. crystals present in the melt; while FIGURE 2 shows the relationship between the crushing strength of the prills in grams and the average dimension of the $Ca(NO_3)_2.O$ aq. crystals that were originally present in the melt to be granulated (N content 15.65%, molar ratio $Ca(NO_3)_2/NH_4NO_3$ 5.2, water-insoluble material 3.3% and moisture content 12%).

The term "crushing strength" as used herein is intended to mean the strength necessary to crush a prill 2 mm. in diameter between two parallel faces.

In view of the limited extent to which prills with a crushing strength of over 500 grams are broken, i.e. less than 5%, even when the centrifuging takes place in continuously operating centrifuges, and the fact that this crushing strength is obtained with an average crystal dimension in the melt of 110μ, an average dimension of less than 110μ should be aimed at in carrying out the present invention. On the other hand, in order to avoid troubles during processing, and since the apparent viscosity at 130° C. should not exceed 1000 cp. (which viscosity value is reached when the average size of the $Ca(NO_3)_2.O$ aq. crystals in the melt becomes less than 10μ as indicated above), it should also be endeavored during evaporation of the melt to prevent the average size of these crystals from becoming smaller than 10μ.

Various means can be used to obtain a melt containing $Ca(NO_3)_2.O$ aq. crystals of the dimensions desired. It is known that the size of the crystals which are formed, as a rule, can be influenced by the choice of the evaporating conditions. This is the case when calcium nitrate melts are evaporated, as will be apparent from the following table, which shows the results of evaporating tests with calcium nitrate containing ammonium nitrate (molar ratio $Ca(NO_3)_2/NH_4NO_3$ 5.2) at atmospheric pressure in a wide-mouthed flask and in a flask with a relatively narrow vapor outlet.

| Flask | Evaporation temperature (° C.) | Evaporation rate, litre vapor/ h./kg. melt | Apparent viscosity at end of evaporation (percent N: 15.65) cp. (130° C.) | Average dimensions $Ca(NO_3)_2.0$ aq. crystal in ($\mu$) |
|---|---|---|---|---|
| Wide-mouthed connection with atm. | 120<br>130<br>150 | 0.095<br>0.131<br>0.207 | 290<br>1,500<br>2,000 | 75<br>5<br>3 |
| Narrow vapor outlet. | 155 | 0.165 | 50 | 250 |
| Narrow vapor outlet with simultaneous passing of 100 litres of air/hour. | 155<br>130 | 0.260<br>0.136 | 250<br>70 | 110<br>225 |
| Narrow vapor outlet with simultaneous passing of 10 litres of air/hour. | 130 | 0.023 | 50 | 250 |

By simple experiments there can be ascertained whatever working conditions should be observed in order that $Ca(NO_3)_2.0$ aq. crystals of the desired dimensions may be obtained in the melt with the use of any available evaporator for calcium nitrate melts.

The dimensions of the $Ca(NO_3)_2.0$ aq. crystals can also be influenced by adding to the melt, prior to the evaporation, one or more soluble strontium or barium compounds. A variety of these compounds may be used, for example the nitrates, the chlorides, and the acetates. Preferably, however, $Sr(NO_3)_2$ or $Ba(NO_3)_2$, is utilized in an amount comprising at least 0.25% by weight of SrO, or 0.40% by weight as BaO, calculated on the weight of the melt which has been concentrated by evaporation. In other words, for every 200 gram atoms of Ca in the melt, there must be in all at least 1 gram atom of Ba and/or Sr. The upper limit of Ba and/or Sr can be varied as desired but generally will not exceed 3 gram atoms per 200 gram atoms of Ca.

The following table shows the effect on the average dimension of the $Ca(NO_3)_2.0$ aq. crystals in the evaporated melt and the crushing strength of the prills prepared from this melt when $Sr(NO_3)_2$ is added to the melt to be evaporated:

| SrO in percent by wt. | Average dimensions of the $Ca(NO_3)_2.0$ aq. crystals ($\mu$) | Crushing strength in grams of prills 2 mm. in diameter |
|---|---|---|
| 0.2 | 150 | 370 |
| 0.3 | 100 | 565 |
| 0.6 | 40 | 915 |
| 1.0 | 30 | 1,050 |
|  | 30 | 1,030 |

It will be appreciated that, in evaporating the melt to the desired moisture content, the $Ca(NO_3)_2.0$ aq. crystals which are formed will have varying dimensions. Hence, in practicing the invention, it is important only that the average crystal dimension be within the limits indicated. In practice, it has been found that, whatever the evaporating conditions, most of the crystals formed will vary little in dimension. Thus, in the case of an average dimension of, for example, $10\mu$, about 50% of the crystals will have dimensions that range between 8 and $12\mu$ and 95% of the crystals between 5 and $15\mu$. With an average dimension of $110\mu$, approximately 50% of the crystals will have dimensions ranging between 88 and $132\mu$ and 95% of the crystals between 46 and $174\mu$. Thus, it will be recognized that, when practicing the invention, the melt will contain some crystals having dimensions outside the average dimension limits stated herein, i.e. crystals smaller than $10\mu$ and larger than $110\mu$, as long as the average dimension is from $10\mu$ to $110\mu$.

As has been explained, there exists a close connection between the apparent viscosity of the calcium nitrate melt and the average dimension of the $Ca(NO_3)_2.0$ aq. crystals present in the melt. Accordingly, in order to determine the quality of the melt it is not absolutely necessary to determine the dimensions of the crystals microscopically, which is a rather difficult and time-consuming task. It is sufficient and much simpler to measure the viscosity by means of a simple rotary viscosimeter, such as illustrated diagrammatically in FIGURE 3.

This viscosimeter comprises a motor 1 which is fed from a voltage source 6. Such a low voltage is used for the motor that the number of revolutions of the motor-driven shaft 3 which has at its bottom end a cylinder 4, falls off considerably when the cylinder experiences some resistance. The cylinder 4 is immersed in the liquid whose viscosity is to be determined.

The number of revolutions of the cylinder is indicated by the deflection of the micro-ammeter 5, which is connected to a tachometer generator 2 provided around the shaft 3.

The instrument is very sensitive to variation in the main voltage 6. Therefore, before each measurement, the apparatus is so adjusted by means of a variable resistance 7 that when the shaft revolves in air the micro-ammeter shows a deflection of 500.

The apparatus is calibrated by means of a series of oils of known viscosities.

In the present case the shaft 3 desirably measures 2 mm. in diameter and the cylinder 4 13 mm. in diameter and 25.7 mm. in height.

This apparatus is related to a calibration curve as shown in FIGURE 4. On the horizontal axis of FIGURE 4 the readings of the micro-ammeter are plotted and on the vertical axis (log scale) the viscosities corresponding to these readings are listed. Since a calcium nitrate melt containing suspended $Ca(NO_3)_2.0$ aq. crystals has thixotropic properties, so that the cylinder of the viscosimeter rotating in this melt influences the viscosity measured, the viscosity determined in this way is not the true viscosity but an apparent viscosity. Hence, throughout the text of this specification, mention is made to apparent viscosity measured by means of the above-described apparatus.

The invention is illustrated, but not limited, by the following example:

A melt was prepared at 130° C. comprising $Ca(NO_3)_2/NH_4NO_3$ in the molar ratio of 5.2. The melt included $Sr(NO_3)_2$ dissolved therein in an amount such as to provide 1.5 gram atoms Sr per 200 gram atoms of Ca in the melt. The melt also included ±25% by weight water.

The above melt was evaporated at 130° C. and 35 mm. Hg pressure to reduce the moisture content to 11.8%. The average dimension of $Ca(NO_3)_2.0$ aq. crystals formed in the melt was $45\mu$ as a result of the strontium compound present therein. The viscosity of the melt varied from 5 centipoises at the start of the evaporation to 290 centipoises at the end. The evaporation was carried out at a rate of 0.130 l./h./kg. smelt.

The thus concentrated melt was then prilled in the usual manner (e.g. as shown in U.S. Patent No. 2,887,723) by spraying the melt into drops which were allowed to fall into mineral oil. The resulting prills (approximately 2 mm. diameter) demonstrated a crushing strength of 900 grams.

It will be appreciated that various modifications may be made in the invention described herein without deviat-

We claim:

1. In a process for granulating ammonium nitrate-containing calcium nitrate melts having a molar ratio of $Ca(NO_3)_2/NH_4NO_3$ between 4.5–9 wherein the melt is evaporated to a moisture content of 10–14% by weight with the formation of $Ca(NO_3)_2.0$ aq. crystals, the thus concentrated melt is then sprayed into drops and said drops are allowed to solidify in a liquid coolant to form spherical granules, the improvement which comprises maintaining an average dimension of between 10 and $110\mu$ for the $Ca(NO_3)_2.0$ aq. crystals in said melt during said evaporation, with 95% of the crystals being in the range between $5\mu$ and $15\mu$ when the average is $10\mu$ and with 95% of the crystals being in the range between $46\mu$ and $174\mu$ when the average is $110\mu$.

2. The process of claim 1 wherein at least one metal salt soluble in the melt and selected from the group consisting of strontium salts and barium salts is dissolved in the melt subjected to evaporation.

3. The process of claim 2 wherein said metal salts is present in the amount of at least 1 gram atom for each 200 gram atoms of Ca.

4. The process of claim 2 wherein said melt includes $Sr(NO_3)_2$.

5. The process of claim 2 wherein said melt includes $Ba(NO_3)_2$.

References Cited in the file of this patent

UNITED STATES PATENTS

| | | |
|---|---|---|
| 2,115,851 | Handforth et al. | May 3, 1938 |
| 2,136,069 | Beekhuis | Nov. 8, 1938 |
| 2,887,723 | Hallie et al. | May 26, 1959 |